Sept. 17, 1963 F. H. GINDROZ 3,104,337
ELECTRO-MECHANICAL CLUTCH
Filed June 15, 1960 2 Sheets-Sheet 1

INVENTOR
FRANK GINDROZ

BY *Scrivener & Parker*

ATTORNEYS

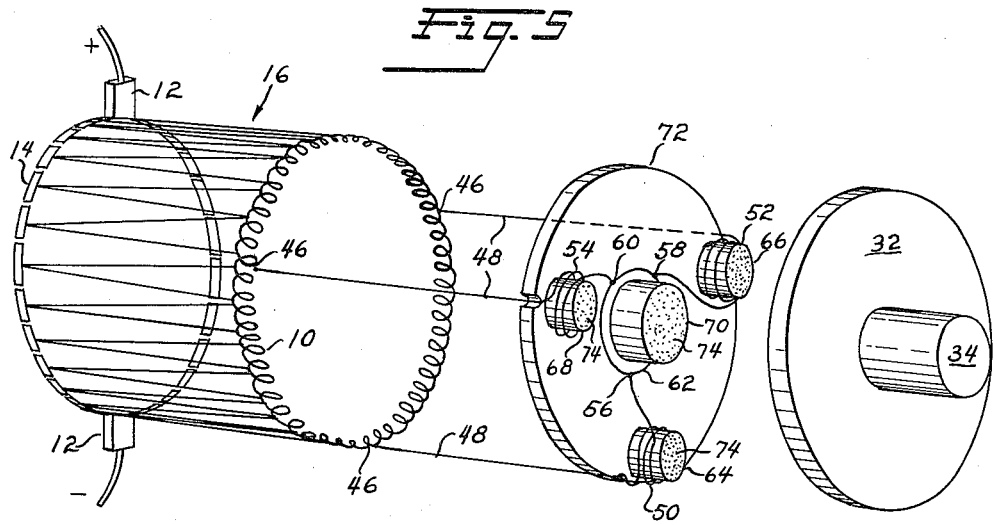

United States Patent Office 3,104,337
Patented Sept. 17, 1963

3,104,337
ELECTRO-MECHANICAL CLUTCH
Frank H. Gindroz, Rolling Hills, Calif., assignor to Electronic Specialty Company, Los Angeles, Calif., a corporation of California
Filed June 15, 1960, Ser. No. 36,342
6 Claims. (Cl. 310—78)

This invention relates to rotary drive clutches and more particularly to friction clutches or the like having electro-magnetic actuating means.

It is a primary object of this invention to provide an electro-mechanical clutch assembly for direct attachment to the armature shaft of an electric motor. Another object of this invention is to provide an electro-mechanical clutch assembly for a commutated input electric motor wherein the electric power for the clutch is derived directly from the drive side of the armature windings and not directly from the commutator. Another object of this invention is to provide an electro-mechanical clutch assembly for a commutated input electric motor wherein no modification of armature slots and windings is necessary. Still a further object of this invention is to provide an electro-mechanical clutch assembly for commutated input electric motors wherein the electro-magnetic actuating means for said clutch includes a three phase winding fed by three phase taps on the drive side of the motor armature winding. Yet another object of this invention is to provide an electro-mechanical clutch assembly for a commutated input electric motor wherein the driving and driven members of the clutch are of laminated armature steel construction.

These and other objects of this invention will become apparent with reference to the following specification and drawings which illustrate preferred embodiments of the invention.

In the drawings:

FIGURE 5 is a schematic diagram of another embodiment of the invention;

FIGURE 6 is a side elevation in partial cross section of the embodiment of FIGURE 5;

FIGURE 7 is a detail of FIGURE 6.

Figure 1:
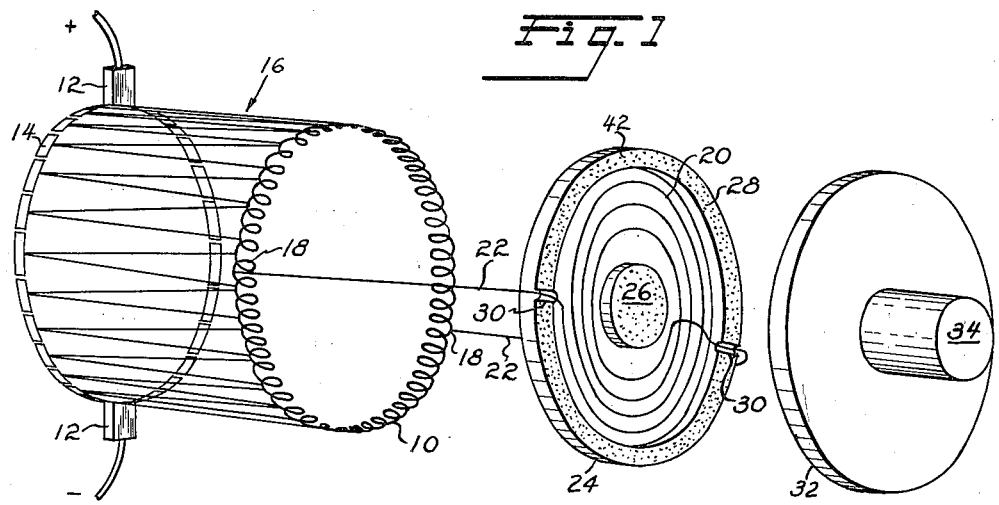
FIGURE 1 is a schematic diagram of one embodiment of the invention.

Referring in detail to the drawings and more particularly to FIG. 1, one embodiment of the invention is shown schematically to comprise an armature winding 10 fed by a power source (not shown) through a pair of brushes 12 in contact with a commutator 14. A plurality of leads 16 connect the commutator segments with the armature winding 10. While the showing of FIGURE 1 is schematic only, the side of the armature winding 10 physically removed from the commutator 14 will be hereinafter referred to as the drive side of the armature winding. A pair of winding taps 18 which are 180 electrical degrees out of phase are located on the drive side of the armature winding 10. A clutch energizing induction coil 20 is connected by leads 22 across the winding taps 18 in a single phase type of connection. The clutch energizing coil 20 is wound in a flat shape as shown and is mounted concentrically about the central raised pole piece 26 on the driving clutch disk 24. An outer peripheral raised pole piece 28 is externally concentric with the clutch energizing coil 20 and includes a pair of access slots 30 for receiving the leads 22. The driven portion of the clutch mechanism comprises an integral plate and shaft combination 32 and 34, respectively.

Figure 2:
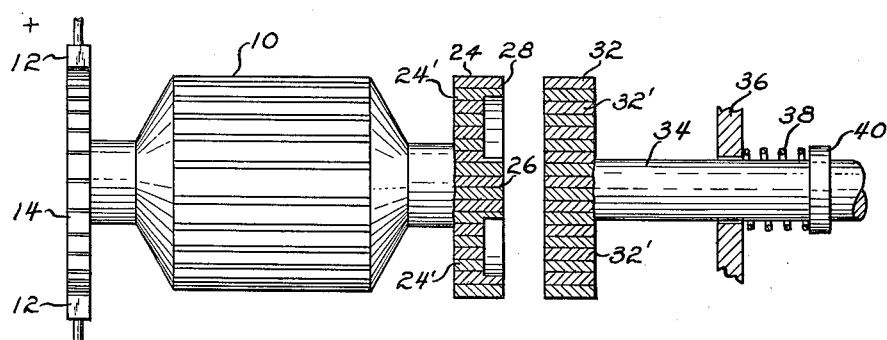
FIGURE 2 is a side elevation in partial cross section of the embodiment shown in FIGURE 1.

In FIG. 2, the elements described with reference to FIG. 1 are shown in their assembled physical relationships. The commutator ring 14, the armature and its winding 10 and the driving clutch disk 24 are all mounted on a common shaft. The driving clutch disk 24 is shown as being made up of a plurality of steel laminations 24' of either the helical or transverse type which may be shaped to form the raised pole pieces 26 and 28. These pole pieces may alternatively be of solid material welded to the disk 24.

The driven clutch disk 32 is also formed of the plurality of steel lamiantions 32' of either the helical or transverse type, as desired. The driven shaft 34 to which the driven disk 32 is attached is slidably journalled in a fixed bearing member 36. A coiled compression spring 38 surrounds the shaft 34 and abuts the surface of the bearing member 36 farthest removed from the driven disk 32 and extends along the shaft until it abuts an annular stop member 40 on shaft 34.

Figure 3:
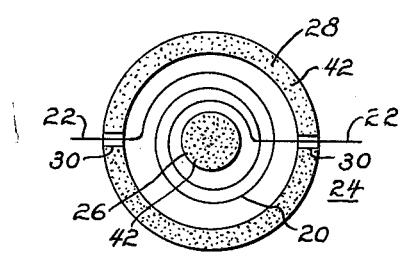
FIGURE 3 is a detail of FIGURE 2.
Figure 4:
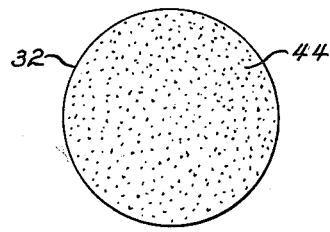
FIGURE 4 is a detail of FIGURE 2.

A detailed end view of the driving clutch disk is shown in FIG. 3 wherein the pole pieces 26 and 28 are shown as having friction surfaces 42. The entire end face of the driven clutch disk 34 is shown in FIG. 4 as comprising a mating friction face 44 adapted to be engaged by the friction faces 42 on the driving clutch disk 24.

A second embodiment of the invention is shown schematically in FIG. 5. The brushes 12, commutator 14 and the rotor or armature winding 10 joined thereto by conductors 16 are in the same arrangement as described above with respect to FIG. 1. Three winding taps 46 are located on the drive side of the armature winding 10 and are spaced 120 electrical degrees from one another forming a three-phase-delta connection. The power from the armature winding 10 is passed from the winding taps 46 through three phase leads 48 to three clutch energizing coils 50, 52 and 54 connected by terminals 56, 58 and 60, respectively, to a central ring shaped conductor 62. This common or neutral conductor 62 and the connection therewith of the three clutch energizing coils 50, 52 and 54, comprises a three-phase-Y connected clutch energizing winding. The energizing coils 50, 52 and 54 are individually wound about a plurality of corresponding pole pieces 64, 66 and 68, respectively and the central ring shaped conductor or neutral connection 62 surrounds a central pole piece 70. All of the pole pieces form an integral part of a driving clutch disk 72 and extend perpendicularly from one face thereof.

In both FIGS. 5 and 7 the pole pieces 64, 66 and 68 are symmetrically disposed with respect to the driving clutch disk 72 and the centers of these pole pieces are so located as to form the apices of an equilateral triangle and the center of the central pole piece 70 is located at the center of the triangle. This arrangement provides a strong, positive acting clutch disk which is both statically and dynamically balanced for rotation.

Referring also to FIG. 6, the driving clutch disk 72 is shown to comprise a plurality of steel laminations 72' of either the helical or transverse type which are joined together by means not shown to form the integral clutch plate 72 and pole pieces 64, 66 and 70. The pole pieces may alternatively be of solid material welded to the disk 72. The driving clutch plate or disk 72 is shown mounted on a common shaft or axis of rotation with the armature and winding 10 and the commutator 14. The driven portion of the clutch mechanism comprises the same integral plate and shaft combination 32 and 34, respectively, and is the same as the corresponding portion of the clutch mechanism described in connection with FIG. 2. Since the face of the driven disk 32 is covered with a friction material 44 as shown in FIGURE 4, the

Operation

In the embodiment of FIGURES 1, 2, 3 and 4, power is supplied to the motor armature winding 10 by way of the brushes 12, commutator 14 and conductors 16. As rotation of the motor armature winding 10 begins, a single phase A.C. voltage varying in frequency with the speed of rotation is induced across the winding taps 18 by their 180 electrical degree phase relationship. This voltage produces a current in the clutch energizing coil 20 by leads 22 which in turn produces magnetic flux in the laminated driving clutch disk 24. The magnetic energization of the coil 20 and clutch disk 24 draws the driven clutch disk 32 and shaft 34 into positive engagement with the outer ends of the pole pieces 26 and 28 of the driving disk 24 against the action of compression spring 38.

The friction material 42 on the pole pieces 26 and 28 engages the friction material 44 on the face of the driven clutch disk 32 and thus the clutching action is completed whereby the driving disk 24 transmits power from the electric motor armature 10 to the driven disk 32 and output shaft 34. When electric power to the armature 10 is cut off and the motor rotation diminishes, the coil 20 will be de-energized and the compression spring 38 acting against the annular stop 40 on the shaft 34 will shift the shaft 34 and driven disk 32 out of engagement with the driving disk 24.

In the embodiment of FIGURES 5, 6 and 7, energization of the armature winding 10 induces a three phase A.C. voltage across the respective delta connected winding taps 46 located on the drive side of the winding 10. This three phase voltage induces a current in the Y-connected three phase magnetizing windings 50, 52 and 54 on the driving disk 72 of the clutch. A magnetic flux is thus produced in the driving disk 72 which is manifested at the pole pieces 64, 66 and 68 associated with the Y-connected coils 50, 52 and 54, respectively, and the central pole piece 70.

The driven clutch disk 32 and sliding shaft 34 are thus drawn into contact with the outer surfaces of the pole pieces 64, 66, 68 and 70 and the friction material 74 thereon by means of magnetic attraction. This clutches the driving power of the armature 10 to the driven shaft 34. When the input power to the armature 10 is disconnected, the compression spring 38 acts from the fixed outer surface of the journal bearing 36 against the annular stop member 40 to move the driven disk 32 out of engagement with the driving disk 74 and thereby declutch the mechanism.

The laminated construction of the two clutch disks 24 and 32 in the first embodiment and 74 and 32 in the second embodiment provide superior strength to that of cast or turned parts and at the same time prevent damaging eddy current heating.

Since the armature winding 10 is tapped on the drive side as opposed to direct connection of the clutch windings to the commutator 14, no extra armature slots, no crowding of present armature slots and no slip rings are need to adapt the clutch device of this invention to an electric motor. The terminals, leads and windings all rotate with the armature winding and therefore require no special external connections.

In the second embodiment the three phase clutch energizing windings 50, 52 and 54 provide a more continuous and therefore higher average power energization of the magnetic clutch whereby a stronger, more reliable and extremely positive clutching action is accomplished. Thus, for the same electric motor, the embodiment of FIGURE 5 provides stronger clutching action for the same input power than does the embodiment of FIGURE 1.

While I have described and illustrated certain forms which my invention may take, it will be apparent to those skilled in the art that other embodiments, as well as modifications of those disclosed, may be made and practiced without departing in any way from the spirit or scope of the invention, for the limits of which reference must be made to the appended claims.

I claim:

1. An electro-mechanical motor and clutch, comprising a motor armature, an armature winding energized from a direct current source through a commutator and armature shaft, an electro-mechanical clutch means comprising a plurality of taps of the armature winding on the drive side thereof, a driving clutch disk mounted for rotation with said armature shaft and including a plurality of magnetic pole pieces, energizing windings mounted on said driving clutch disk concentrically disposed with respect to at least one of the pole pieces, a plurality of leads connecting the said energizing windings with the said winding taps whereby energizing power is applied thereto during energization of the said armature winding, and a driven clutch disk and shaft normally biased out of engagement with the said pole pieces on said driving clutch disk when said energizing windings are de-energized and being drawn into engagement with the said pole pieces by magnetic attraction when said energizing windings are energized.

2. An electro-mechanical motor and clutch, comprising a motor armature, an armature winding energized from a direct current source through a commutator, an electro-mechanical clutch comprising a plurality of taps of the armature winding on the drive side thereof, a driving clutch disk mounted for rotation with said armature, an energizing winding mounted on said driving clutch disk, a central pole piece on said driving clutch disk within and concentric with said energizing winding and a peripheral pole piece on said driving clutch disk outside and concentric with said energizing winding, a plurality of leads connecting said energizing winding with said winding taps whereby energizing power is applied to the energizing winding during energization of the armature winding, and a driven clutch disk and shaft normally biased out of engagement with the pole pieces on the driving clutch disk when the energizing winding is de-energized and being drawn into engagement with said pole pieces by magnetic attraction when the energizing winding is energized.

3. An electro-mechanical motor and clutch, comprising a motor armature, an armature winding energized from a direct current source through a commutator, an electro-mechanical clutch comprising three winding taps on the drive side of the armature winding mutually disposed one-hundred-twenty electrical degrees out of phase with one another, a driving clutch disk mounted for rotation with said armature and including a plurality of magnetic pole pieces, three individual energizing windings mounted on said driving clutch disk each of which is concentrically disposed with respect to one of said pole pieces and one terminal of each of the three windings being joined together and to a common neutral point to form a three-phase-Y connection, the other terminal of each of said energizing windings being connected by a lead to one of said winding taps whereby energizing power is applied thereto during energization of the said armature winding, and a driven clutch disk and shaft normally biased out of engagement with the said pole pieces of the driving clutch disk when the energizing windings are de-energized and being drawn into engagement with the said pole pieces by magnetic attraction when said energizing windings are energized.

4. The invention defined in claim 3 wherein said winding taps form a delta connection with said armature winding.

5. The invention defined in claim 3 wherein said driven and said driving clutch disks comprise spiral wound laminated armature steel.

6. The invention defined in claim 3 wherein said plurality of pole pieces comprises three symmetrically disposed pole pieces, each pole piece being enclosed by a respective one of said three energizing windings, said symmetrically disposed pole pieces having their centers as the apices of an equilateral triangle defined by the said centers, and a central pole piece having the center thereof located at the median of the said triangle, the base of said central pole piece being surrounded by a continuous ring shaped conductor commonly connected to all of the said energizing windings whereby the common neutral point for the said Y connection is provided.

References Cited in the file of this patent
UNITED STATES PATENTS

| | | |
|---|---|---|
| 513,895 | Dewey | Jan. 30, 1894 |
| 2,644,905 | Brueder | July 7, 1953 |
| 2,663,809 | Winslow | Dec. 22, 1953 |
| 2,795,711 | Miller | June 11, 1957 |